United States Patent [19]

Mojden

[11] 4,364,466
[45] Dec. 21, 1982

[54] CAN END SEPARATOR-CONVEYOR

[75] Inventor: Wallace W. Mojden, Hinsdale, Ill.

[73] Assignee: Fleetwood Systems, Inc., Countryside, Ill.

[21] Appl. No.: 206,456

[22] Filed: Nov. 13, 1980

[51] Int. Cl.³ .................... B65G 47/31; B65G 47/26; B65H 5/02
[52] U.S. Cl. .................................. 198/459; 198/461; 414/330; 271/149
[58] Field of Search ...................... 198/459, 461, 624; 414/124, 130, 112, 105, 104, 330; 221/251; 271/30 A, 149

[56] References Cited

U.S. PATENT DOCUMENTS

| 3,074,533 | 1/1963 | Ninneman | 198/459 |
| 3,115,232 | 12/1963 | Carter | 198/459 |
| 3,337,064 | 8/1967 | Mojden | |
| 3,521,763 | 7/1970 | Heide et al. | 414/330 |
| 3,718,217 | 2/1973 | Stobb et al. | 271/30 A |
| 3,878,945 | 4/1975 | Mojden | |

FOREIGN PATENT DOCUMENTS

| 133653 | 1/1979 | Fed. Rep. of Germany | 414/104 |
| 2390353 | 1/1979 | France | 271/30 A |
| 83339 | 11/1956 | Netherlands | 198/459 |

Primary Examiner—John J. Love
Assistant Examiner—Brian Bond
Attorney, Agent, or Firm—Trexler, Bushnell & Wolters, Ltd.

[57] ABSTRACT

A conveyor system is arranged for transporting and spacing can ends by means of confronting flexible conveyor belts which are spaced apart to grip can ends at the edges, in combination with means for frictionally engaging the can ends in the space between the conveyor belts.

7 Claims, 6 Drawing Figures

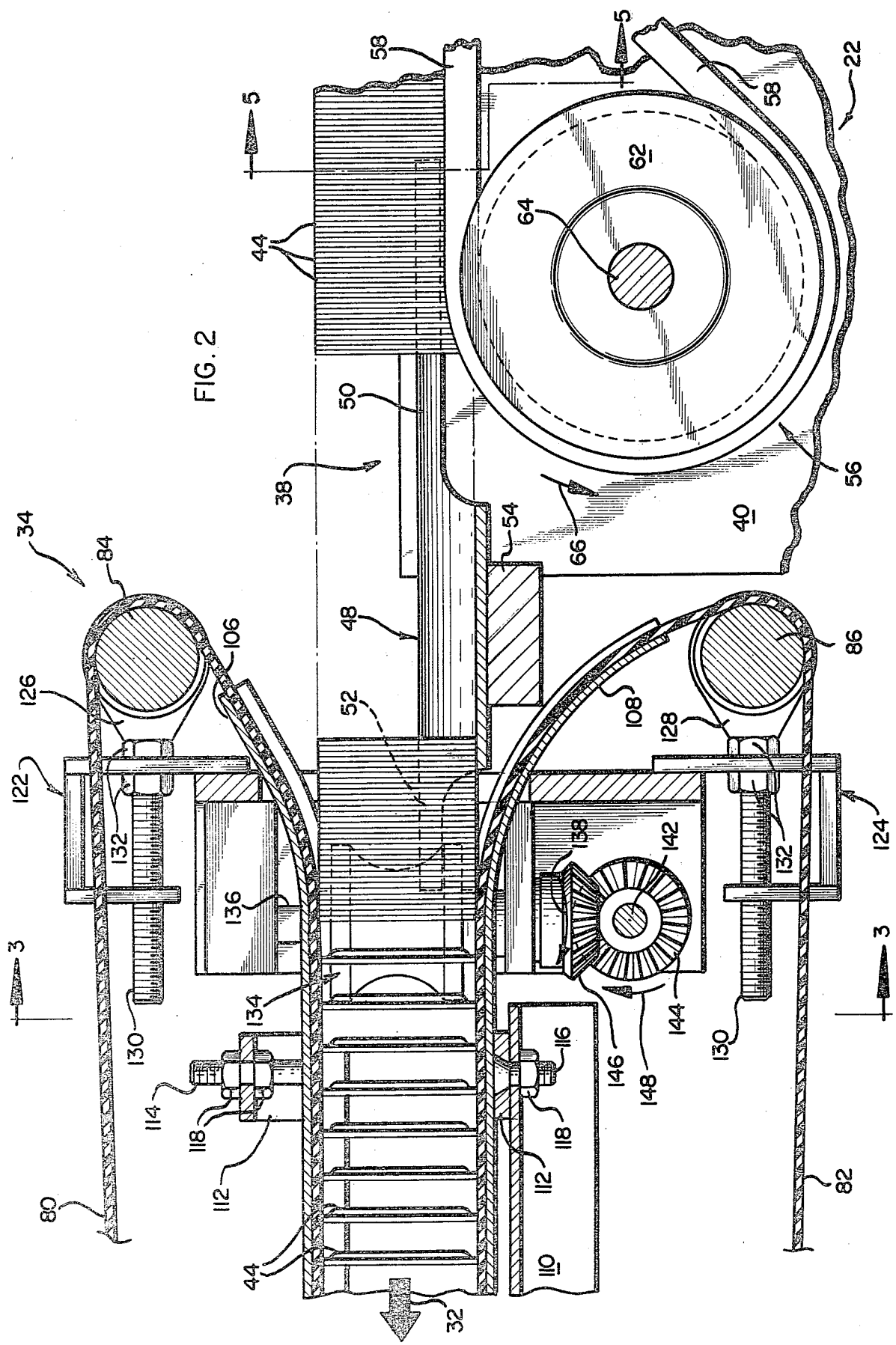

CAN END SEPARATOR-CONVEYOR

FIELD OF THE INVENTION

This invention relates generally to the manufacture of metal containers and more particularly to the art of applying end seam compound to the peripheral channel of can ends. Specifically, the present invention relates to can end conveyor systems.

BACKGROUND OF THE INVENTION

In the manufacture of can ends, an elastomeric gasketing compound is commonly applied to the annular channel defined between the cover hook and the seaming panel radius prior to seaming of the end onto a can body. This gasketing compound is arranged to reside in the crimped end seam juxtaposed between the cover hook and the body hook in order to provide an hermetic seal. In the past, quick drying, solvent-base compounds, formulated with a volatile hydrocarbon diluent or thinner such as hexane, have been widely employed. However, solvent vapors generated upon the curing of these compounds result in undesirable atmospheric pollution. In response, water-base compounds have been developed and these produce no such effluvium. The latter compositions have the disadvantage, however, of requiring comparatively long drying times, on the order of ninety seconds or more; and existing can end handling equipment is arranged to stack the ends immediately after application of the end seam compound, thus confining the escaping moisture and prolonging the drying time, even with the use of a drying oven.

BRIEF DESCRIPTION OF THE INVENTION

Applicant has found that a can end conveyor, disposed downstream from the compound applying station, may be specially arranged to facilitate the drying of water-base end seam compounds. More particularly, applicant has invented a can end conveyor which accepts stacked can ends, separates the ends, and then conveys them in spaced-apart relationship through the drying cycle.

It is accordingly a general object of the present invention to provide a new and improved can end conveyor system.

Another object of the invention is to provide a can end conveyor which transports the ends in spaced relationship whereby to facilitate curing of end seam compound.

These and other objects and features of the invention will become more apparent from a consideration of the following descriptions.

BRIEF DESCRIPTION OF THE DRAWINGS

In order that the principles of the present invention may be readily understood, a single embodiment thereof, applied to a horizontal can end conveyor but to which the application is not to be restricted, is shown in the accompanying drawings wherein:

FIG. 2 is an enlarged, side elevational view taken in longitudinal cross-section to show the feed end of the conveyor system of FIG. 1 and portions of the roller drive arrangement used therein;

DETAILED DESCRIPTION

Figure 1:
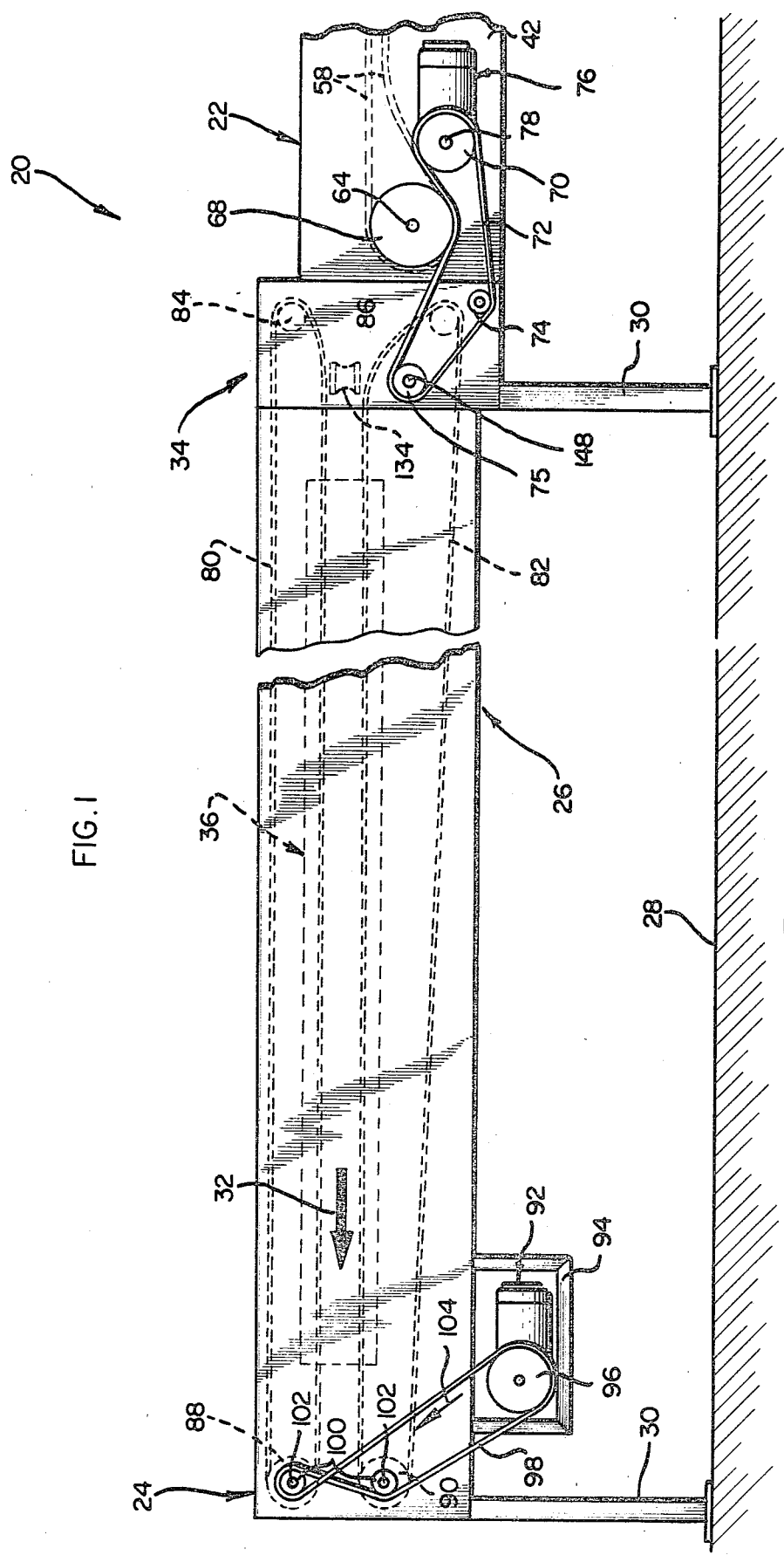
FIG. 1 is a side elevational view, partially broken away, showing a can end conveyor system constructed in compliance with the present invention.

Referring now in detail to the drawings, and giving first attention to FIG. 1, a conveyor system indicated generally by the reference numeral 20 is constructed to include a feed section 22, an output or delivery section 24 and a transport section 26 located between the sections 22 and 24. The conveyor system 20 is supported at a suitable height above a factory floor 28 by means of a suitable number of adjustable machine legs 30; and as will be described more fully hereinafter, stacked can ends fresh from an end seam compound applying station are delivered from the feed section 22 to be spaced apart and conveyed through the transport section 26 in the machine direction indicated generally by an arrow 32 in order to promote curing of the end seam compound. Specifically, a can end separating station 34 is located between the feed section 22 and the transport section 26; and desirably, a conventional forced-air drying oven unit contained within a plenum chamber 36 is arranged with the transport section 26 in order to pass a heated air stream between the spaced can ends for accelerating the curing action. The plenum 36 may also house equipment for distributing sterilizing vapor, such as steam, between the can ends.

Figure 5:
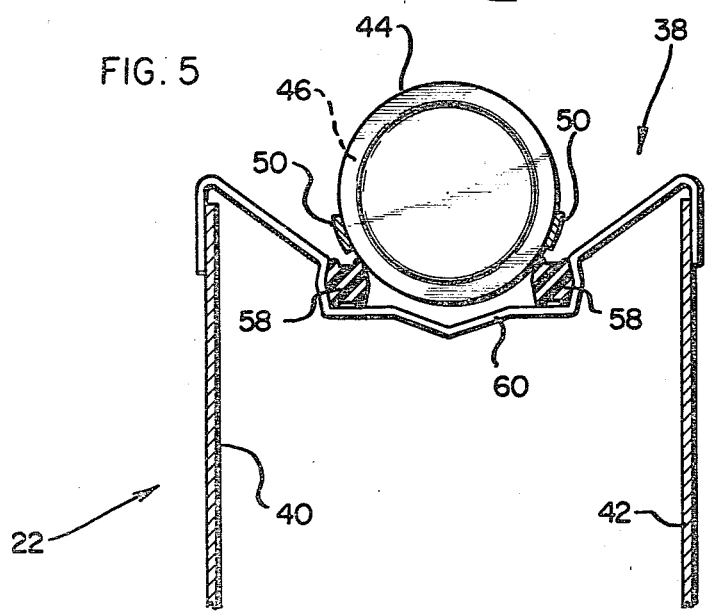
FIG. 5 is a further elevational view taken substantially along the section line 5—5 of FIG. 2.

Turning to a consideration of FIG. 2 in conjunction with FIG. 5 for a more detailed description of the feed section 22, a generally V-shaped trough arrangement 38 is mounted atop a pair of side plates 40 and 42 in order to receive and support stacked can ends 44 which are of a planar, disc-like nature and which have freshly applied end seam compound 46 disposed in the annular channel defined between the cover hook and the seaming panel radius. The trough arrangement 38 includes a half-tubular guide 48 having rearwardly extending elongated finger rails 50 and abbreviated, forwardly extending finger rails 52, the rails 50 and 52 being laterally spaced, as is best seen in FIG. 5, for guidably directing movement of the can ends 44 in the machine direction 32. A suitably positioned structural frame element 54 supports the guide 48.

A can end transfer unit 56 is incorporated in the feed section 22 in order to advance the stacked can ends; and the transfer unit 56 includes a pair of laterally-spaced, stiffly flexible drive belts 58 which are positioned at the root of trough arrangement 38 by means of an upwardly opening channel 60 as is best seen in FIG. 5. The drive belts 58 are trained over respective guide pulleys 62 fixed on a common shaft 64 and over suitable idler rollers, not shown. In order to advance the can ends 44, the pulleys 62 are driven in the rotary direction indicated generally by an arrow 66 employing a driven sprocket 68 which is mounted on the shaft 64. Sprocket 68 is powered by a drive sprocket 70 using an endless chain 72, best seen in FIG. 1. The path of drive chain 72 is further defined by an idler sprocket 74 and a driven sprocket 75 which supplies power to the separating station 34. Power is applied to the chain 72 by a motor-gear reducer unit 76 which includes an output shaft 78 upon which the drive sprocket 70 is mounted.

Continuing now with reference to FIGS. 1 and 2, the can ends 44 are conveyed through the transport section 26 by means of confronting, flexible, upper and lower conveyor belts which are indicated respectively by the reference numerals 80 and 82. The conveyor belts 80 and 82 are guided through the can end separating station 34 by means including individual upper and lower idler rollers 84 and 86; and motive power is applied to these conveyor belts by respective upper and lower drive rolls 88 and 90 which are located at the output or delivery section 24 of the conveyor system 20 as is shown in FIG. 1. A suitably energized and adjustable motor-gear reducer unit 92 which is securely mounted in a pendant frame arrangement 94 delivers rotative power to the rollers 88 and 90 through an output sprocket 96, an endless drive chain 98 and driven sprockets 100 which are coupled to the rollers 88 and 90 by means of respective common shafts 102. The motor-gear reducer unit 92 powers the drive chain 98 in the general direction indicated by an arrow 104 in order to transport the confronting portions of the belts 80 and 82 in the machine direction of arrow 32 and at the same linear or longitudinal speed in order to maintain upright position and proper spacing of the traveling can ends.

In compliance with the present invention, the confronting runs of conveyor belts 80 and 82 are spaced apart a predetermined distance in order to grip the can ends 44 at the edges thereof as is illustrated in FIG. 2. For this purpose, upper and lower guide plates 106 and 108 are adjustably positioned in the can end separating station 34 by means of machine brackets 110 and 112, threaded fasteners 114 and 116; and suitable lock nuts 118.

Figure 6:
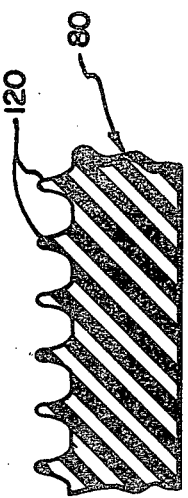
FIG. 6 is a detailed sectional view of the conveyor belt material used in the system of FIGS. 1-5.
Figure 3:
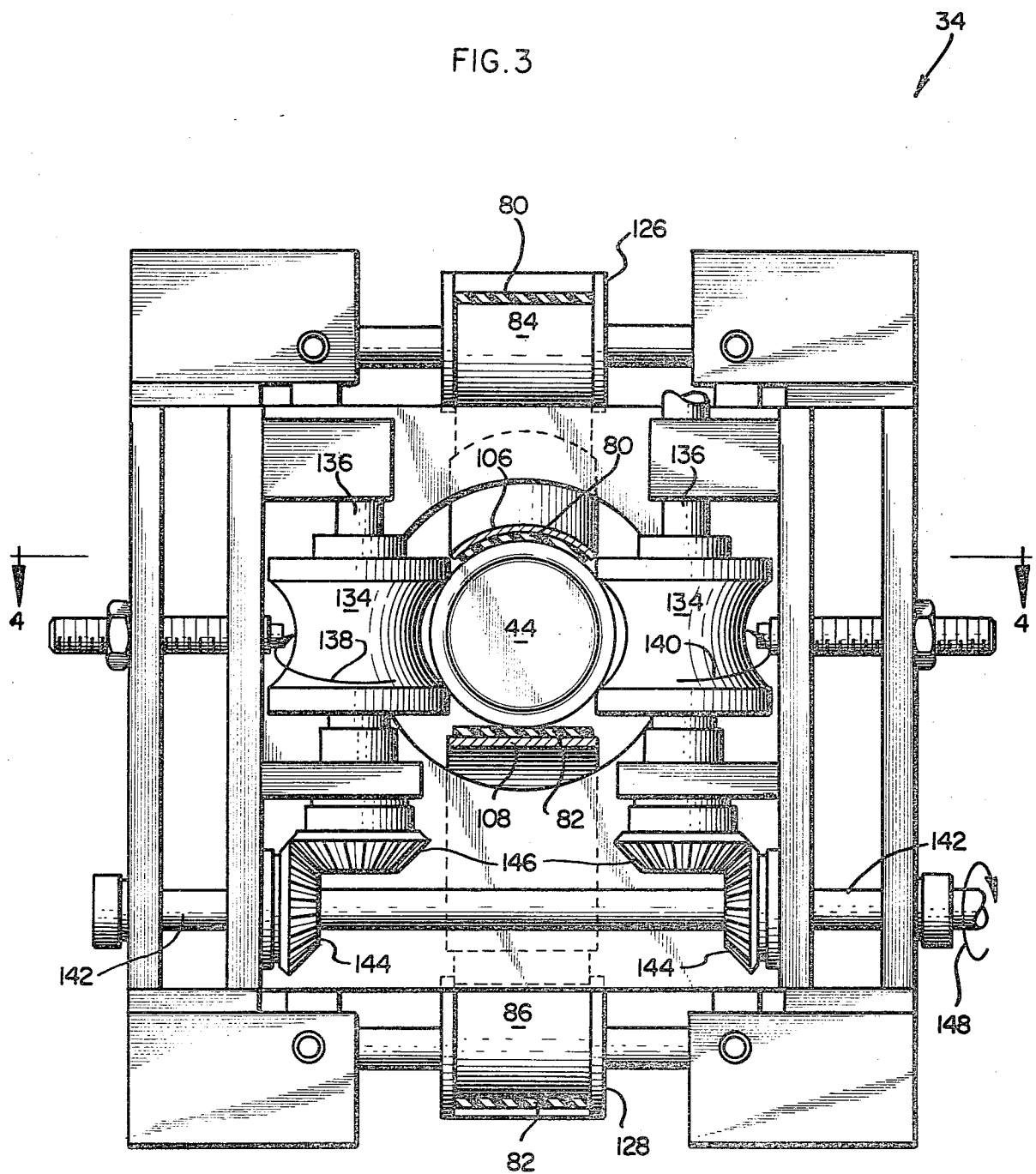
FIG. 3 is an end elevational view taken substantially along the section line 3—3 of FIG. 2.
Figure 4:
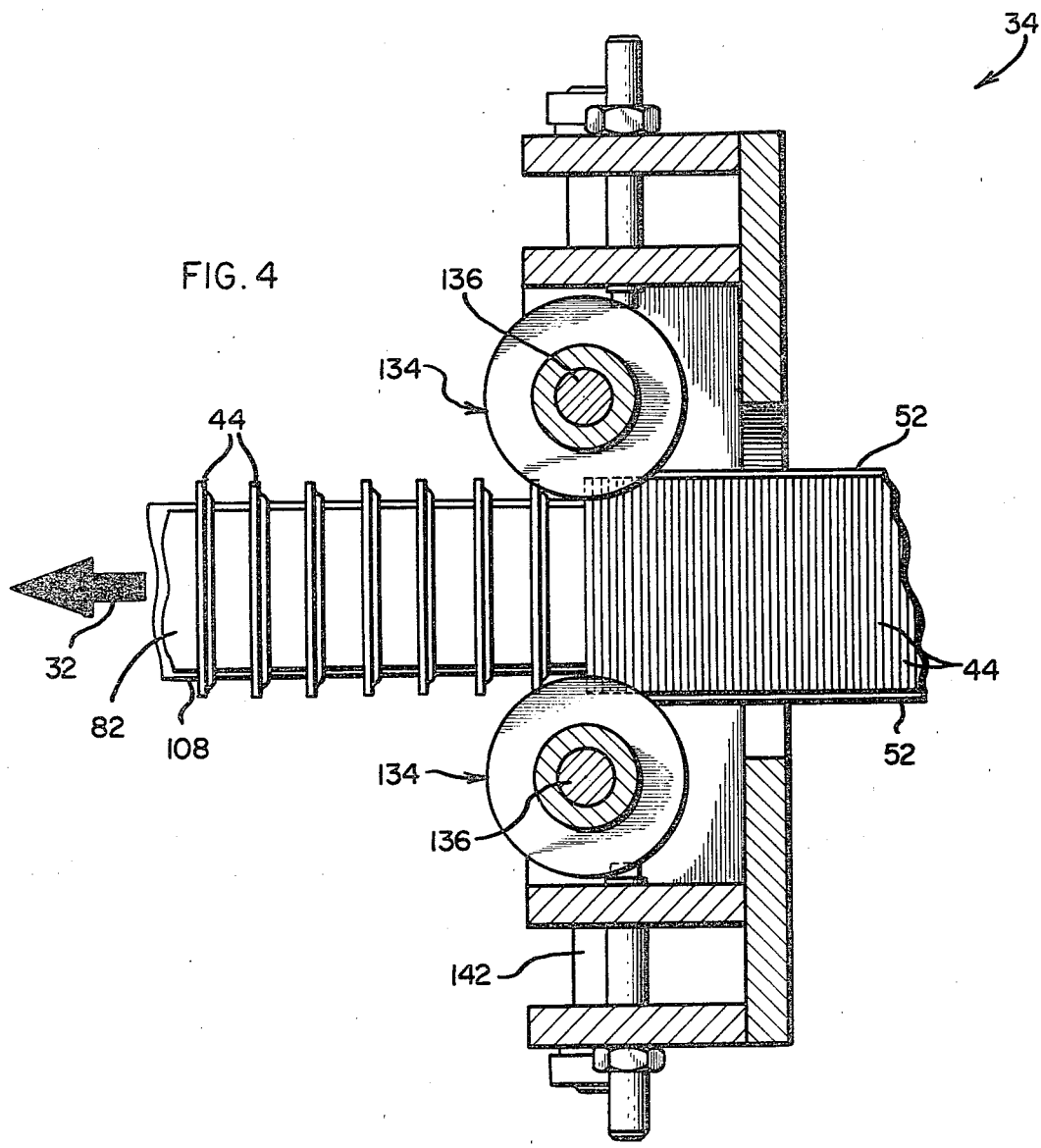
FIG. 4 is a view taken substantially along the section line 4—4 of FIG. 3.

According to the illustrated embodiment, at least one of the conveyor belts 80 and 82 is formed into semicylindrical shape in order to promote secure gripping of the edges of the can ends 44. For this purpose, one or both of the guides 106 and 108, specifically the guide 106 in the illustrated embodiment, is fashioned into the desired configuration, as is best illustrated in FIG. 3. In further accord with the principles of the present invention, the conveyor belts 80 and 82 are preferably fabricated with textured outer surfaces by means of a suitable thread or patterns of nubs 120 shown in FIG. 6.

The idler roller 84 and 86 for the conveyor belts 80 and 82 are mounted in the can end separating station 34 by means of generally U-shaped brackets 122 and 124, a pair of yokes 126 and 128 each of which terminates in a threaded stem 130, and suitable locknuts 132.

In order to impart spacing between the indvidual conveyed can ends 44 from the stacked condition in which the can ends are arrayed in the trough arrangement 38, frictional retarding of the can ends is accomplished as the individual can ends are picked up by the traveling conveyor belts 80 and 82 at the separating station 34. In the illustrated embodiment, these frictional retarding means comprise a pair of laterally spaced, diploconical roller members 134 which are mounted on shafts 136 for rotation in the respective directions indicated by the arrows 138 and 140 in FIG. 3. In order to present the desired frictional factor and resiliency to the edges of the can ends 44, the roller members 134 are advantageously fabricated from a cast, elastomeric polyurethane resin, which is resiliently deformable to grip the ends.

In order to rotate the roller members 134 so as to produce an effective, differentially lesser speed in the machine direction 32 than the linear speed of the belts 80 and 82, the roller member shafts 136 are positively driven in unison from a transverse shaft 142. A pair of spaced beveled gears 144 are keyed or otherwise suitably affixed to the shaft 142 in order to mesh with companion beveled gears 146 which are secured to the respective roller member shafts 136. The shaft 142 is rotated in the direction of arrow 148 from drive chain 72 by means of the drive sprocket 75 mounted on one end of the shaft 142 as is shown in FIG. 1. The drive and driven shafts for operating the rollers 134 are suitably journalled in the machine frame of the conveyor system 20.

For purposes of affording a more complete understanding of the invention, it is advantageous now to provide a functional description of the mode in which the component parts operate.

Elastomeric gasketing compound is first applied to each of the can ends 44 in a conventional end seam compound applying machine where the semi-finished ends are stacked and then delivered to the feed section 22 of the conveyor system of the present invention. The can ends 44, clearly shown stacked in FIG. 2, are advanced in the machine direction 32 by the drive belts 58, movement of the can ends through the trough arrangement 38 being directed by the guide 48 and its component finger rails 50 and 52.

As the can ends 44 pass from the trough arrangement 38, they are picked up and further advanced in the machine direction by the conveyor belts 80 and 82; and as is well illustrated in FIG. 2, frictional engagement of the roller members 134 drags or retards the can ends instantaneously because the effective linear speed of the roller members is differentially lesser than the forward speed of the conveyor belts 80 and 82. This momentary retarding action of the roller members 134 spaces the can ends; and because the conveyor belts 80 and 82 are moving at a common speed and because the belts are arranged to grip the can ends at the edges thereof, the can ends are advanced in continuation of their spacing. When the spaced can ends pass through the oven unit contained within the plenum chamber 36, a heated air stream flows between the can ends and serves to dry and cure the end seam compound. Residual moisture or solvent is allowed to pass from the end seam compound as the can ends 44 are passed to the output or delivery section 24 of the conveyor system 20; and at this juncture, the can ends may be stacked in paper-wrapped rolls or packaged in cartons.

It will be apparent from the foregoing descriptions, that the conveyor system of the present invention provides a fast and efficient scheme for curing end seam compounds and is applicable to either water-base or solvent-base gasketing compositions.

The specific embodiment herein shown and described is to be considered as being primarily illustrative. Various changes in structure will, no doubt, occur to those skilled in the art; and such changes are to be understood as forming a part of this invention insofar as they fall within the spirit and scope of the appended claims. By way of example, while the embodiment illustrated involves a drying chamber, the invention may be employed in other types of can handling operations. More specifically, where solvent base compound is used, the chamber 36 could be a venting chamber for containment and removal of the solvent vapors for delivery to an incinerator unit wherein the hydrocarbons are burned off. As a final example, where the ends have to be sterilized, the chamber 36 could house a gas or thermal sterilizing operation.

The invention is claimed as follows:

1. A conveyor system for handling a stack of can ends in face-wise engagement with the axes of the individual ends making up said stack being disposed generally longitudinally to a given path of movement for said ends, and for separating individual can ends from the stack and conveying said ends along said path while maintaining separation of the individual can ends and the generally longitudinal disposition of the can end axes, said conveyor system comprising; receiving means for receiving a stack of can ends in face-wise engagement; a pair of confronting conveyor members positioned substantially parallel to each other and disposed along and defining said path of movement for the can ends, said conveyor members being spaced apart to engage the edges of the can ends at diametrically opposed locations; drive means for imparting linear movement to each said conveyor member and the can ends gripped thereby; and retarding means disposed intermediate said receiving means and said conveyor members for frictionally engaging the can ends to impart spacing between the individual can ends as they are engaged by said confronting conveyor members for movement along said path.

2. A conveyor system for manipulating and transporting can ends, comprising: a trough for receiving stacked can ends; transfer means for advancing the stacked can ends through said trough in the machine direction; confronting, flexible conveyor belts positioned to receive can ends from said trough and spaced apart to grip can ends at the edges thereof; first drive means for imparting linear motion to said belts and the can ends gripped thereby; confronting roller members positioned for frictionally engaging can ends in the space between said conveyor belts; and second drive means for rotating said roller members at differentially lesser speed in the machine direction than the speed of said belts, whereby to impart spacing between the conveyed can ends.

3. A conveyor system for manipulating and transporting can ends according to claim 2 wherein said roller members having diploconical shape whereby matably to engage the circular edges of the can ends.

4. A conveyor system for manipulating and transporting can ends according to claim 2 wherein said second drive means includes power transmitting means for driving said roller members at a common speed.

5. A conveyor system for manipulating and transporting can ends according to claim 2 wherein said conveyor system further comprises guide means for forming at least one of said flexible conveyor belts into semicylindrical shape whereby to promote gripping of the edges of the can ends.

6. A conveyor system for manipulating and transporting can ends according to claim 2 wherein said conveyor belts include textured surface means for gripping the edges of the can ends.

7. A conveyor system for manipulating and transporting can ends according to claim 2 wherein said first drive means includes power transmitting means for driving said belts at the same speed.

* * * * *